(12) United States Patent
Yun et al.

(10) Patent No.: US 11,370,971 B2
(45) Date of Patent: *Jun. 28, 2022

(54) LIQUID CRYSTAL ALIGNMENT FILM AND LIQUID CRYSTAL DISPLAY DEVICE USING THE SAME

(71) Applicant: LG CHEM, LTD., Seoul (KR)

(72) Inventors: Hyeong Seuk Yun, Daejeon (KR); Sung Joon Min, Daejeon (KR); Jun Young Yoon, Daejeon (KR); Jung Ho Jo, Daejeon (KR)

(73) Assignee: LG CHEM, LTD., Seoul (KR)

(*) Notice: Subject to any disclaimer, the term of this patent is extended or adjusted under 35 U.S.C. 154(b) by 156 days.

This patent is subject to a terminal disclaimer.

(21) Appl. No.: 16/484,906

(22) PCT Filed: Sep. 21, 2018

(86) PCT No.: PCT/KR2018/011265
§ 371 (c)(1),
(2) Date: Aug. 9, 2019

(87) PCT Pub. No.: WO2019/078502
PCT Pub. Date: Apr. 25, 2019

(65) Prior Publication Data
US 2020/0002615 A1  Jan. 2, 2020

(30) Foreign Application Priority Data

Oct. 17, 2017  (KR) .................. 10-2017-0134828
Sep. 20, 2018  (KR) .................. 10-2018-0113253

(51) Int. Cl.
*C09K 19/56* (2006.01)
*G02F 1/1337* (2006.01)

(52) U.S. Cl.
CPC ........ *C09K 19/56* (2013.01); *G02F 1/133723* (2013.01); *C09K 2323/00* (2020.08); *C09K 2323/02* (2020.08); *C09K 2323/027* (2020.08); *G02F 1/1337* (2013.01)

(58) Field of Classification Search
CPC ............... C09K 19/56; C09K 2323/00; C09K 2323/02; C09K 2323/025; C09K 2323/027; G02F 1/1337; G02F 1/133711; G02F 1/133723; C08G 59/506; C08L 63/00; C08L 79/08
USPC ............. 428/1.2, 1.26; 524/249; 528/353; 525/449; 252/299.4
See application file for complete search history.

(56) References Cited

U.S. PATENT DOCUMENTS

| | | | |
|---|---|---|---|
| 6,841,654 B2 | 1/2005 | Gu et al. | |
| 7,435,357 B2 | 10/2008 | Harding et al. | |
| 8,232,366 B2 | 7/2012 | Kim et al. | |
| 8,366,962 B2 | 2/2013 | Ootsuki et al. | |
| 9,034,567 B2 | 5/2015 | Miyake et al. | |
| 9,791,745 B2 | 10/2017 | Hwang et al. | |
| 10,316,128 B2 | 6/2019 | Yun et al. | |
| 10,556,979 B2 | 2/2020 | Yun et al. | |
| 2002/0054967 A1 | 5/2002 | Shin et al. | |
| 2004/0138408 A1 | 7/2004 | Harris et al. | |
| 2006/0054859 A1 | 3/2006 | Shundo et al. | |
| 2008/0160222 A1 | 7/2008 | Harding et al. | |
| 2010/0060834 A1 | 3/2010 | Fang et al. | |
| 2010/0069520 A1 | 3/2010 | Kim et al. | |
| 2011/0111341 A1 | 5/2011 | Kim et al. | |
| 2011/0200939 A1 | 8/2011 | Lee et al. | |
| 2012/0194771 A1 | 8/2012 | Mizusaki et al. | |
| 2013/0165598 A1 | 6/2013 | Yoo et al. | |
| 2014/0072730 A1 | 3/2014 | Hwang et al. | |
| 2015/0056544 A1 | 2/2015 | Miyake et al. | |
| 2016/0178969 A1 | 6/2016 | Miyake et al. | |
| 2017/0017155 A1 | 1/2017 | Tsutsumi | |
| 2017/0066968 A1 | 3/2017 | Lee et al. | |
| 2017/0226257 A1 | 8/2017 | Yun et al. | |
| 2018/0348578 A1 | 12/2018 | Jo et al. | |
| 2018/0373099 A1 | 12/2018 | Yun et al. | |
| 2019/0049798 A1 | 2/2019 | Yun et al. | |
| 2019/0309118 A1 | 10/2019 | Yun et al. | |
| 2020/0002615 A1 | 1/2020 | Yun et al. | |
| 2020/0024521 A1 | 1/2020 | Kim et al. | |
| 2020/0124922 A1 | 4/2020 | Min et al. | |
| 2020/0190405 A1 | 6/2020 | Kim et al. | |

FOREIGN PATENT DOCUMENTS

| | | |
|---|---|---|
| CN | 101042505 A | 9/2007 |
| CN | 102372808 A | 3/2012 |
| CN | 102893208 A | 1/2013 |
| CN | 103173228 A | 6/2013 |
| CN | 103387833 A | 11/2013 |

(Continued)

OTHER PUBLICATIONS

Benicewicz, et al., "Magnetic Field Orientation of Liquid Crystalline Epoxy Thermosets", Macromolecules, vol. 31, pp. 4730-4738, 1998.

Amendola, et al., "Crosslinked Anisotropic Network Based On Liquid Crystalline Precursor as Liquid Crystal Aligning Layer", Optical science, engineering and instrumentation 1997 (Oct. 30, 1997); SPIE vol. 3143, 0277-786X, pp. 201-205.

Sarkar, et al., "Synthesis and liquid-crystal-aligning properties of novel aromatic poly(amide imide)s bearing n-alkyloxy side chains," Journal of Applied Polymer Science, vol. 105, 1793-1801 (2007).

Ichimura, et al., "Command surfaces, 20: Fixation of surface-assisted homogeneous alignment of nematic liquid crystals by cationic photopolymerization," Macromot. Rapid Commun., 17, 545-551 (1996).

(Continued)

*Primary Examiner* — Ruiyun Zhang
(74) *Attorney, Agent, or Firm* — Rothwell, Figg, Ernst & Manbeck, P.C.

(57) ABSTRACT

A liquid crystal alignment film comprising a polymer, having an excellent alignment property, stability, and high film strength, and thus exhibiting excellent durability and a high residual image characteristic, and a liquid crystal display device using the liquid crystal alignment film.

8 Claims, No Drawings

(56) References Cited

FOREIGN PATENT DOCUMENTS

| | | |
|---|---|---|
| CN | 103805214 A | 5/2014 |
| CN | 106062631 A | 10/2016 |
| EP | 3315544 A1 | 5/2018 |
| JP | H05-255502 A | 10/1993 |
| JP | 2004-281148 A | 10/2004 |
| JP | 2006-232809 A | 9/2006 |
| JP | 2007-034284 A | 2/2007 |
| JP | 2008-015497 A | 1/2008 |
| JP | 2011-237755 A | 11/2011 |
| JP | 2013-235130 A | 11/2013 |
| JP | 2015-040950 A | 3/2015 |
| JP | 2016-139121 A | 8/2016 |
| JP | 2017-161602 A | 9/2017 |
| KR | 10-2002-0032922 A | 5/2002 |
| KR | 10-2006-0082106 A | 7/2006 |
| KR | 10-0629192 B1 | 9/2006 |
| KR | 10-2007-0021095 A | 2/2007 |
| KR | 10-2007-0029100 A | 3/2007 |
| KR | 2007-0071997 A | 7/2007 |
| KR | 10-0842156 B1 | 6/2008 |
| KR | 10-2008-0065543 A | 7/2008 |
| KR | 10-2008-0090680 A | 10/2008 |
| KR | 10-2009-0129641 A | 12/2009 |
| KR | 10-2010-0062923 A | 6/2010 |
| KR | 10-2011-0069716 A | 6/2011 |
| KR | 10-2012-0077467 A | 7/2012 |
| KR | 10-2012-0098421 A | 9/2012 |
| KR | 10-1286432 B1 | 7/2013 |
| KR | 10-1317642 B1 | 10/2013 |
| KR | 10-2014-0059124 A | 5/2014 |
| KR | 10-2015-0037579 A | 4/2015 |
| KR | 10-1526253 B1 | 6/2015 |
| KR | 10-2015-0138548 A | 12/2015 |
| KR | 10-2015-0139426 A | 12/2015 |
| KR | 2016-0074567 A | 6/2016 |
| KR | 10-2016-0095801 A | 8/2016 |
| KR | 10-2017-0028473 A | 3/2017 |
| KR | 10-2018-0020722 A | 2/2018 |
| KR | 10-1856725 B1 | 5/2018 |
| TW | 201130889 A1 | 9/2011 |
| TW | I452088 B | 9/2014 |
| TW | I480314 B | 4/2015 |
| TW | I646179 B | 1/2019 |
| WO | 2000-036464 A1 | 6/2000 |
| WO | 2011-043109 A1 | 4/2011 |
| WO | 2011-115078 A1 | 9/2011 |
| WO | 2015-016118 A1 | 2/2015 |
| WO | WO-2018097625 A3 * | 7/2018 ............. C08G 73/10 |

OTHER PUBLICATIONS

International Search Report and Written Opinion issued for PCT Patent Application No. PCT/KR2017/013433 dated May 23, 2018, 10 pages.

International Search Report and Written Opinion issued of International Application No. PCT/KR2018/011265 dated Feb. 11, 2019, 9 pages.

Richard J. Lewis, Sr., editor; "Hawley's Condensed Chemical Dictionary." 12th edition; Van Nostrand Reinhold Company, New York; 1993 (no month); excerpts pp. 12, 35-36, 766-767,581-582, 871.

* cited by examiner

LIQUID CRYSTAL ALIGNMENT FILM AND LIQUID CRYSTAL DISPLAY DEVICE USING THE SAME

CROSS-REFERENCE TO RELATED APPLICATION(S)

This application is a 35 U.S.C. § 371 National Phase Entry Application from PCT/KR2018/011265, filed on Sep. 21, 2018, and designating the United States, which claims priority to and the benefit of Korean Patent Application No. 10-2017-0134828, filed on Oct. 17, 2017, and Korean Patent Application No. 10-2018-0113253, filed on Sep. 20, 2018, with the Korean Intellectual Property Office, the disclosures of which are incorporated herein by reference in their entirety.

TECHNICAL FIELD

The present invention relates to a liquid crystal alignment film having not only an excellent alignment property and stability, but also high film strength, and thus exhibits excellent durability and a high residual image characteristic, and a liquid crystal display device using the same.

BACKGROUND ART

In a liquid crystal display device, a liquid crystal alignment film plays a role of aligning liquid crystals in a certain direction. Specifically, a liquid crystal alignment film serves as a director in the arrangement of liquid crystal molecules, and thus, when the liquid crystals move by an electric field to form an image, it helps them to move in an appropriate direction. Generally, in order to obtain uniform brightness and a high contrast ratio in a liquid crystal display device, it is essential to uniformly align liquid crystals.

As a conventional method for aligning liquid crystals, a rubbing method of coating a polymer film such as a polyimide onto a substrate such as glass or the like and rubbing the surface thereof in a predetermined direction using fibers such as nylon or polyester has been used. However, the rubbing method may cause serious problems during the manufacturing process of the liquid crystal panel because fine dust or electrostatic discharge (ESD) occurs when the fiber and polymer film are rubbed together.

In order to solve the problems of the rubbing method, a photo-alignment method for inducing anisotropy in a polymer film by light irradiation rather than the rubbing, and aligning liquid crystals using anisotropy, has been studied recently.

As materials that can be used for the photo-alignment method, various materials have been introduced, among which the polyimide is mainly used for various superior performance of a liquid crystal alignment film. However, a common polyimde is usually poor in solubility in a solvent, so it is difficult to apply it directly to a manufacturing process for forming an alignment film by coating in a solution state. Accordingly, after coating in the form of a precursor such as a polyamic acid or a polyamic acid ester having excellent solubility, a high-temperature heat treatment process is performed to form the polyimide, which is then subjected to light irradiation to align liquid crystals.

However, as a large amount of energy is required for obtaining sufficient liquid crystal alignment properties by subjecting the film in the form of polyimide to light irradiation, it is difficult to secure substantial productivity, and additionally, there is a limitation that an additional heat treatment process is required for securing alignment stability after the light irradiation.

DETAILED DESCRIPTION OF THE INVENTION

Technical Problem

It is one object of the present invention to provide a liquid crystal alignment film having not only an excellent alignment property and stability, but also high film strength, and thus exhibits excellent durability and a high residual image characteristic.

It is another object of the present invention to provide a liquid crystal display device including the above-mentioned liquid crystal alignment film.

Technical Solution

In order to achieve the above objects, the present invention provides a liquid crystal alignment film including: a polymer containing a first repeating unit including at least one selected from the group consisting of the following Chemical Formula 1 to Chemical Formula 3; and a second repeating unit including at least one selected from the group consisting of the following Chemical Formula 4 and Chemical Formula 5, wherein the liquid crystal alignment film has a retardation value of 3 nm or higher:

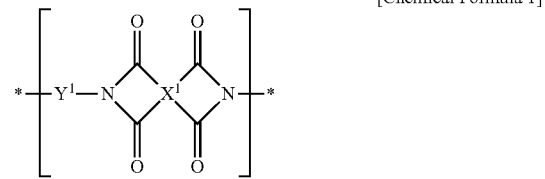

[Chemical Formula 1]

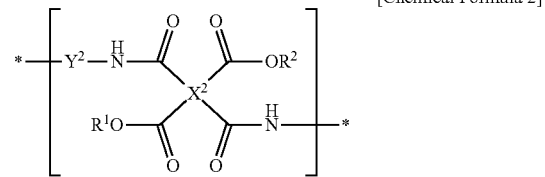

[Chemical Formula 2]

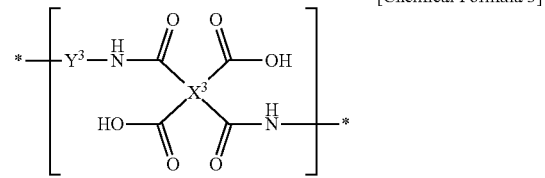

[Chemical Formula 3]

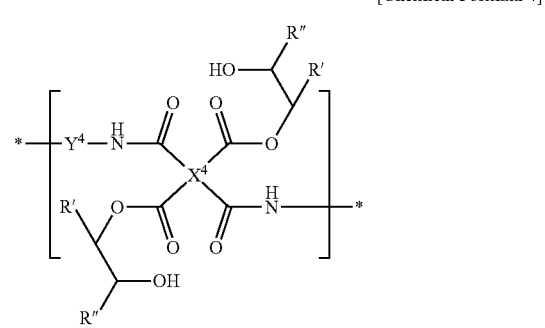

[Chemical Formula 4]

[Chemical Formula 5]

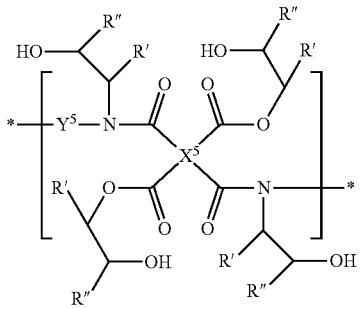

wherein, in Chemical Formulae 1 to 5, at least one of $R^1$ and $R^2$ is an alkyl group having 1 to 10 carbon atoms, and the rest are hydrogen, and $X^1$ to $X^5$ are each independently a tetravalent organic group represented by the following Chemical Formula 6:

[Chemical Formula 6]

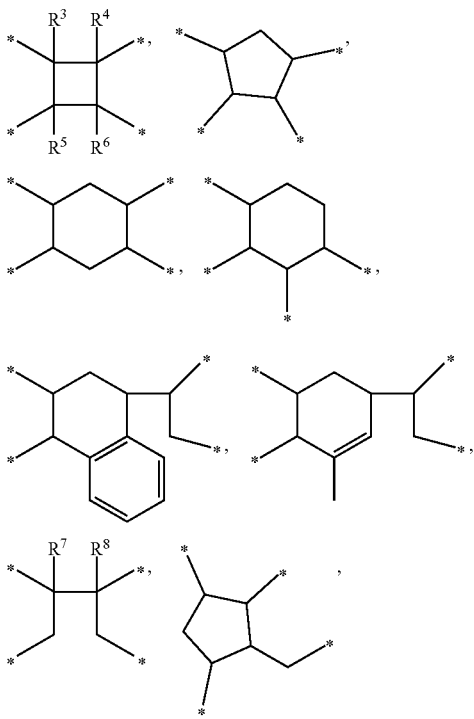

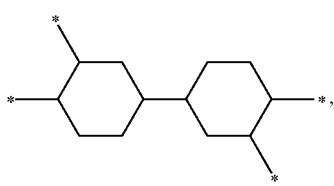

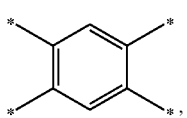

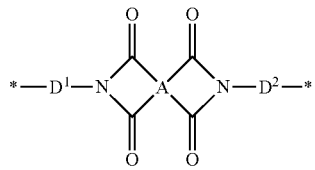

wherein, in Chemical Formula 6, $R^3$ to $R^8$ are each independently hydrogen or an alkyl group having 1 to 10 carbon atoms, $L^1$ is any one selected from the group consisting of a direct bond, —O—, —CO—, —COO—, —S—, —SO—, —$CR^9R^{10}$—, —$(CH_2)_Z$—, —$O(CH_2)_ZO$—, —$COO(CH_2)_Z$OCO—, —CONH—, phenylene, or a combination thereof, wherein $R^9$ and $R^{10}$ are each independently hydrogen, an alkyl group having 1 to 10 carbon atoms, or a fluoroalkyl group having 1 to 10 carbon atoms, Z is an integer of 1 to 10, and $Y^1$ to $Y^5$ are each independently a divalent organic group represented by the following Chemical Formula 7:

[Chemical Formula 7]

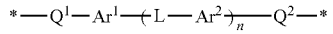

wherein, in Chemical Formula 7,

A is a tetravalent organic group represented by Chemical Formula 6, and $D^1$ and $D^2$ are each independently an arylene group having 6 to 20 carbon atoms; and in Chemical Formulae 4 and 5, at least one of R' and R" is a functional group containing a mesogenic group in the molecule, wherein the functional group is represented by the following Chemical Formula 8, and the rest are hydrogen,

[Chemical Formula 8]

$*—Q^1—Ar^1\!-\!(L—Ar^2)_n\!-\!Q^2—*$ wherein, in Chemical Formula 8, $Ar^1$ and $Ar^2$ are each independently an arylene group having 6 to 30 carbon atoms, $Q^1$ and $Q^2$ are a direct bond, an alkylene group having 1 to 10 carbon atoms, or an alkyleneoxy group having 1 to 10 carbon atoms, each L is independently a direct bond, —COO—, —OCO—, —$C(CH_3)$=CH—, or —$C(CH_3)$=N—N=$C(CH_3)$—, and n is 0, 1, or 2.

As described above, the liquid crystal alignment film according to the present invention includes the second repeating unit formed by reacting a common polyimide or a precursor repeating unit thereof with a reactive mesogenic epoxy additive, together with the first repeating unit including a common polyimide or a precursor repeating unit thereof, thereby preparing an alignment film having excellent film strength and good aligning properties.

In particular, in the first repeating unit and the second repeating unit, the divalent organic group represented by Chemical Formula 7 is independently used for each of $Y^1$ to $Y^5$ functional groups derived from diamine, and thus the polymer including the first repeating unit can have anisotropy by UV exposure.

Herein, in the second repeating unit, through the anisotropy obtained during UV exposure by the divalent organic group represented by Chemical Formula 7, liquid crystal alignment is carried out from the mesogenic group-containing functional group included in the second repeating unit, thereby improving liquid crystal aligning performance. In addition, the mesogenic group-containing functional group in the second repeating unit can improve the film strength while forming a bond through the reaction with the polyimide or a precursor thereof.

More specifically, the liquid crystal alignment film according to the present invention can be prepared by a method including: coating a liquid crystal aligning agent composition containing a polyimide precursor and a reactive mesogenic epoxy onto a substrate and drying it to form a coating film; irradiating the coating film with linearly polarized light without an imidization step to induce initial anisotropy; inducing the alignment of the reactive mesogen epoxy present in the alignment film initially through a low-temperature heat treatment; carrying out an epoxy reaction to prepare a reactive mesogen liquid crystal film in the alignment film; and then subjecting the liquid crystal film to a high-temperature heat treatment at a higher temperature than that of the low-temperature heat treatment to carrying out the imidization.

In other words, since it is possible to achieve alignment stability due to the anisotropy of the liquid crystal film produced in the low-temperature heat treatment step, the reactive mesogen epoxy can be used to thereby prevent the occurrence of residual image characteristics while increasing a film strength.

Hereinafter, the present invention will be described in detail for each component.

Definition of Terms

Unless specified otherwise herein, the following terms can be defined as follows.

The hydrocarbon having 4 to 20 carbon atoms may be an alkane having 4 to 20 carbon atoms, an alkene having 4 to 20 carbon atoms, an alkyne having 4 to 20 carbon atoms, a cycloalkane having 4 to 20 carbon atoms, a cycloalkene having 4 to 20 carbon atoms, an arene having 6 to 20 carbon atoms, or a fused ring in which at least one of the cyclic hydrocarbons shares two or more atoms, or a hydrocarbon to which at least one of the hydrogens is chemically bonded. Specifically, examples of the hydrocarbon having 4 to 20 carbon atoms may include n-butane, cyclobutane, 1-methylcyclobutane, 1,3-dimethylcyclobutane, 1,2,3,4-tetramethylcyclobutane, cyclopentane, cyclohexane, cycloheptane, cyclooctane, cyclohexene, 1-methyl-3-ethylcyclohexene, bicyclohexyl, benzene, biphenyl, diphenylmethane, 2,2-diphenylpropane, 1-ethyl-1,2,3,4-tetrahydronaphthalene, 1,6-diphenylhexane, etc.

The alkyl group having 1 to 10 carbon atoms may be a straight-chain, branched-chain, or cyclic alkyl group. Specifically, the alkyl group having 1 to 10 carbon atoms may be a straight-chain alkyl group having 1 to 10 carbon atoms, a straight-chain alkyl group having 1 to 5 carbon atoms, a branched-chain or cyclic alkyl group having 3 to 10 carbon atoms, or a branched-chain or cyclic alkyl group having 3 to 6 carbon atoms. More specifically, examples of the alkyl group having 1 to 10 carbon atoms may include a methyl group, an ethyl group, an n-propyl group, an iso-propyl group, an n-butyl group, an iso-butyl group, a tert-butyl group, an n-pentyl group, an iso-pentyl group, a neo-pentyl group, a cyclohexyl group, etc.

The alkoxy group having 1 to 10 carbon atoms may be a straight-chain, branched-chain, or cyclic alkoxy group. Specifically, the alkoxy group having 1 to 10 carbon atoms may be a straight-chain alkoxy group having 1 to 10 carbon atoms, a straight-chain alkoxy group having 1 to 5 carbon atoms, a branched-chain or cyclic alkoxy group having 3 to 10 carbon atoms, or a branched-chain or cyclic alkoxyl group having 3 to 6 carbon atoms. More specifically, examples of the alkoxy group having 1 to 10 carbon atoms may include a methoxy group, an ethoxy group, an n-propoxy group, an iso-propoxy group, an n-butoxy group, an iso-butoxy group, a tert-butoxy group, an n-pentoxy group, an iso-pentoxy group, a neo-pentoxy group, a cycloheptoxy group, etc.

The fluoroalkyl group having 1 to 10 carbon atoms may be a group in which at least one hydrogen in the alkyl group having 1 to 10 carbon atoms is substituted with fluorine, and the fluoroalkoxy group having 1 to 10 carbon atoms may be a group in which at least one hydrogen in the alkoxy group having 1 to 10 carbon atoms is substituted with fluorine.

The alkenyl group having 2 to 10 carbon atoms may be a straight-chain, branched-chain, or cyclic alkenyl group. Specifically, the alkenyl group having 2 to 10 carbon atoms may be a straight-chain alkenyl group having 2 to 10 carbon atoms, a straight-chain alkenyl group having 2 to 5 carbon atoms, a branched-chain alkenyl group having 3 to 10 carbon atoms, a branched-chain alkenyl group having 3 to 6 carbon atoms, a cyclic alkenyl group having 5 to 10 carbon atoms, or a cyclic alkenyl group having 6 to 8 carbon atoms. More specifically, examples of the alkenyl group having 2 to 10 carbon atoms may include an ethenyl group, a propenyl group, a butenyl group, a pentenyl group, a cyclohexenyl group, etc.

The halogen may be fluorine (F), chlorine (Cl), bromine (Br), or iodine (I).

In the present specification, the aryl group is not particularly limited, but an aryl group having 6 to 60 carbon atoms is preferred, and it may be a monocyclic aryl group or a polycyclic aryl group. According to one embodiment, the aryl group has a carbon number of 6 to 30. According to one embodiment, the aryl group has a carbon number of 6 to 20. The monocyclic aryl group may be a phenyl group, a biphenyl group, a terphenyl group, and the like, but is not limited thereto. The polycyclic aryl group may be a naphthyl group, an anthracenyl group, a phenanthryl group, a pyrenyl group, a perylenyl group, a chrycenyl group, a fluorenyl group, and the like, but is not limited thereto.

In the present specification, an alkylene group is a divalent functional group derived from an alkane, and examples thereof may include a straight-chain, branched-chain, or cyclic-chain of a methylene group, an ethylene group, a propylene group, an isobutylene group, a sec-butylene group, a tert-butylene group, a pentylene group, a hexylene group, and the like.

In the present specification, the arylene group refers to a group having two bonding sites in the aryl group, that is, a divalent group. The description of the aryl group described above can be applied, except that each of these is a divalent group.

The multivalent organic group derived from an arbitrary compound refers to a residue in which a plurality of hydrogen atoms bonded to the arbitrary compound are removed.

In one example, a tetravalent organic group derived from cyclobutane refers to a residue in which any four hydrogen atoms bonded to cyclobutane are removed.

In the present specification, the notation -* refers to a residue in which hydrogens at the relevant site are removed. For example, the notation

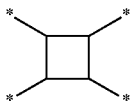 [SMILES: *C1C(*)C(*)C1*]

refers to a residue in which four hydrogen atoms bonded to carbon numbers 1, 2, 3, and 4 of cyclobutane are removed, that is, it refers to any one of tetravalent organic groups derived from cyclobutane.

In the present specification, a direct bond means that no other atoms are present in the parts represented as $L^1$, $L^2$, L, and the like.

Liquid Crystal Alignment Film

The liquid crystal alignment film of one embodiment may include a polymer containing a first repeating unit including at least one selected from the group consisting of Chemical Formula 1 to Chemical Formula 3; and a second repeating unit including at least one selected from the group consisting of Chemical Formula 4 and Chemical Formula 5.

That is, the first repeating unit may include one repeating unit of Chemical Formula 1, one repeating unit of Chemical Formula 2, one repeating unit of Chemical Formula 3, or a mixture of two or more thereof. In addition, the second repeating unit may include one repeating unit of Chemical Formula 4, one repeating unit of Chemical Formula 5, or a mixture of two or more thereof.

The polymer may be prepared by curing a composition including reactive precursor compounds (including monomers, oligomer, and polymers) capable of forming the first repeating unit and the second repeating unit, and the weight average molecular weight of the polymer (measured by GPC) may be 5000 (MW) to 100,000 (MW).

In the present specification, the weight average molecular weight refers to a weight average molecular weight in terms of polystyrene measured by the GPC method. In the process of measuring the weight average molecular weight in terms of polystyrene measured by the GPC method, a detector and an analytical column, such as a commonly known analysis apparatus and differential refractive index detector, can be used, and commonly applied temperature conditions, solvents, and flow rates can be used. Specific examples of the measurement conditions are as follows: a Waters PL-GPC220 instrument is used, a Polymer Laboratories PLgel MIX-B is used, a 300 mm column is used at an evaluation temperature of 160° C., 1,2,4-trichlorobenzene is used as a solvent, the flow rate is 1 mL/min, a sample is prepared at a concentration of 10 mg/10 mL and then fed in an amount of 200 μL, and the value of Mw can be determined using calibration curves formed from a polystyrene standard. The molecular weight of the polystyrene standards used herein is nine kinds of 2000/10,000/30,000/70,000/200,000/700,000/2,000,000/4,000,000/10,000,000.

As the first repeating unit and the second repeating unit included in the polymer contain the divalent organic group represented by Chemical Formula 7, anisotropy can be produced by directly irradiating the light without a heat treatment process after the formation of the coating film, following by carrying out a heat treatment to complete the alignment film, and therefore, it is possible to prepare a liquid crystal alignment film capable of not only reducing a large amount of light irradiation energy, but also having an excellent aligning property and stability as well as a high voltage holding ratio and electrical characteristics.

The functional group containing a mesogenic group in the molecule may be presented by the following Chemical Formula 8:

[Chemical Formula 8]

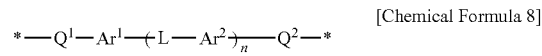

wherein, in Chemical Formula 8, $Ar^1$ and $Ar^2$ are each independently an arylene group having 6 to 30 carbon atoms, $Q^1$ and $Q^2$ are a direct bond, an alkylene group having 1 to 10 carbon atoms, or an alkyleneoxy group having 1 to 10 carbon atoms, each L is independently a direct bond, —COO—, —OCO—, —C(CH$_3$)=CH—, or —C(CH$_3$)=N—N=C(CH$_3$)—, and n is an integer of 0, 1, or 2.

Specific examples of the arylene group having 6 to 30 carbon atoms include a phenylene group, a biphenylene group, a terphenylene group, a naphthylene group, an anthracenylene group, a phenanthrylene group, a pyrenylene group, a perylenylene group, a chrycenylene group, a fluorenyl group, or the like.

The alkyleneoxy group having 1 to 10 carbon atoms is a functional group in which an alkylene group having 1 to 10 carbon atoms and an ether group are bonded, and specifically, it may be represented by the formula —RO—. In this formula, R is an alkylene group having 1 to 10 carbon atoms.

Preferably, the functional group containing a mesogenic group in the molecule may be a functional group including an aromatic cyclic ester group in the molecule. Specifically, for example, in Chemical Formula 8, it may be a functional group, wherein $Ar^1$ and $Ar^2$ are each independently phenylene, $Q^1$ and $Q^2$ are each independently an alkyleneoxy group having 1 to 3 carbon atoms, L is —COO—, and n is 1. More specifically, in Chemical Formula 8, it may be a functional group derived from 4-(oxiran-2-ylmethoxy)phenyl 4-(oxiran-2-ylmethoxy)benzoate where $Ar^1$ and $Ar^2$ are each independently phenylene, $Q^1$ and $Q^2$ are each independently a methyleneoxy group having 1 carbon atom, L is —COO—, and n is 1, which functional group is represented by the following Chemical Formula 8-1.

[Chemical Formula 8-1]

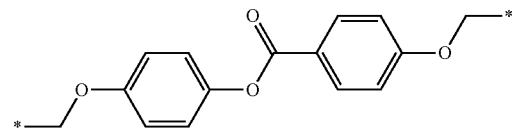

In addition, in Chemical Formula 8, it may be a functional group, wherein $Ar^1$ and $Ar^2$ are each independently phenylene, $Q^1$ and $Q^2$ are each independently an alkyleneoxy group having 1 to 3 carbon atoms, L is —COO— or —OCO—, and n is 2.

More specifically, in the functional group represented by Chemical Formula 8, when n is 2, it may be a functional group represented by the following Chemical Formula 8-2.

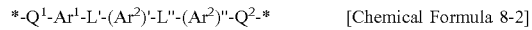

In Chemical Formula 8-2, $Ar^1$, $(Ar^2)'$ and $(Ar^2)''$ are each independently phenylene or biphenylene, $Q^1$ and $Q^2$ are each independently an alkyleneoxy group having 1 to 3 carbon atoms, L' is —COO—, and L" may be —OCO—.

More specifically, for example, it may be a functional group derived from 1,4-phenylene bis(4-(oxiran-2-ylmethoxy)benzoate), wherein in Chemical Formula 8-2, $Ar^1$, $(Ar^2)'$, and $(Ar^2)''$ are each independently phenylene, $Q^1$ and $Q^2$ are each independently a methyleneoxy group having 1 carbon atom, L' is —COO—, and L" is —OCO—, which functional group is represented by thy following Chemical Formula 8-3.

[Chemical Formula 8-3]

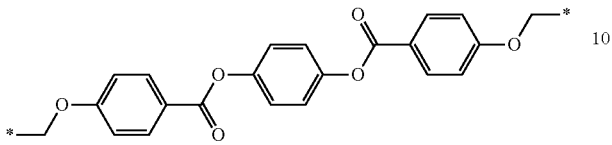

In addition, it may be a functional group derived from biphenyl-4,4'-diyl bis(4-(oxiran-2-ylmethoxy)benzoate), wherein in Chemical Formula 8-2, $Ar^1$ and $(Ar^2)''$ are each independently phenylene, $(Ar^2)'$ is biphenylene, $Q^1$ and $Q^2$ are each independently a methyleneoxy group having 1 carbon atom, L' is —COO—, and L" is —OCO—, which functional group is represented by the following Chemical Formula 8-4.

[Chemical Formula 8-4]

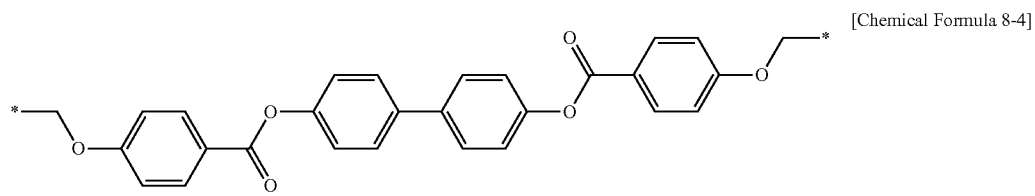 [SMILES: *COc1ccc(C(=O)Oc2ccc(-c3ccc(OC(=O)c4ccc(OC*)cc4)cc3)cc2)cc1]

As described above, in Chemical Formulae 4 and 5, as the functional group including an aromatic cyclic ester group is used as the functional group containing a mesogenic group in the molecule, the liquid crystal aligning properties are enhanced and the retardation value of the liquid crystal cells prepared using the liquid crystal alignment film increases, thereby realizing excellent AC residual image characteristics.

Meanwhile, the polymer may further include a functional group represented by the following Chemical Formula 9 or a functional group represented by the following Chemical Formula 10 at at least one terminal end:

[Chemical Formula 9]

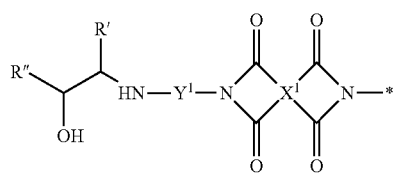

wherein, in Chemical Formula 9,
$X^1$, $Y^1$, R', and R" are as defined in Chemical Formulae 1, 4, and 5,

[Chemical Formula 10]

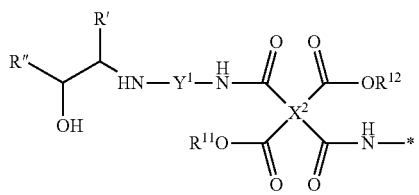

wherein, in Chemical Formula 10,
$R^{11}$ and $R^{12}$ are each independently hydrogen or an alkyl group having 1 to 10 carbon atoms, and
$X^2$, $Y^2$, R', and R" are as defined in Chemical Formulae 2, 4, and 5.

Meanwhile, the polymer may further include a polymer containing a third repeating unit including at least one selected from the group consisting of the following Chemical Formulae 11 to 13; and a fourth repeating unit including at least one selected from the group consisting of the following Chemical Formulae 14 and 15:

[Chemical Formula 11]

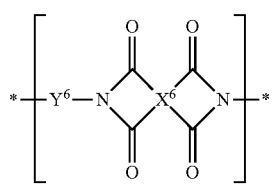

-continued

[Chemical Formula 12]
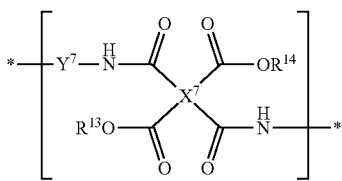

[Chemical Formula 13]
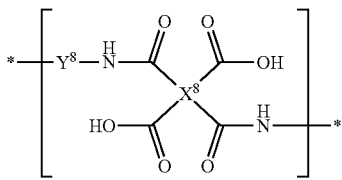

[Chemical Formula 14]
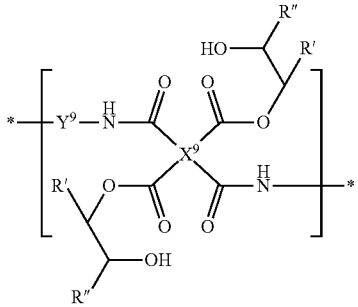

[Chemical Formula 15]
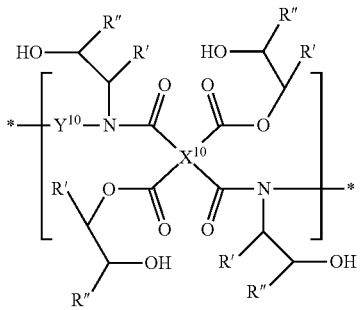

wherein, in Chemical Formulae 11 to 15, at least one of $R^{13}$ and $R^{14}$ is an alkyl group having 1 to 10 carbon atoms, and the rest are hydrogen, $X^6$ to $X^{10}$ are each independently a tetravalent organic group represented by Chemical Formula 6, and $Y^6$ to $Y^{10}$ are each independently a divalent organic group represented by the following Chemical Formula 16,

[Chemical Formula 16]
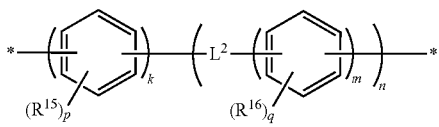

wherein, in Chemical Formula 16, $R^{15}$ and $R^{16}$ are each independently hydrogen, a halogen, a cyano, a nitrile, an alkyl having 1 to 10 carbon atoms, an alkenyl having 1 to 10 carbon atoms, an alkoxy having 1 to 10 carbon atoms, a fluoroalkyl having 1 to 10 carbon atoms, or a fluoroalkoxy having 1 to 10 carbon atoms, p and q are each independently an integer of 0 to 4, $L^2$ is a direct bond, —O—, —CO—, —S—, —SO$_2$—, —C(CH$_3$)$_2$—, —C(CF$_3$)$_2$—, —CONH—, —COO—, —(CH$_2$)$_y$—, —O(CH$_2$)$_y$O—, —O(CH$_2$)$_y$—, —NH—, —NH(CH$_2$)$_y$—NH—, —NH(CH$_2$)$_y$O—, —OCH$_2$—C(CH$_3$)$_2$—CH$_2$O—, —OCO—(CH$_2$)$_y$—OCO—, or —OCO—(CH$_2$)$_y$—OCO—, y is an integer of 1 to 10, k and m are each independently an integer of 0 to 3, n is an integer of 0 to 3, and R' and R" are as defined in Chemical Formulae 4 and 5.

In the liquid crystal alignment film, the weight ratio between a polymer containing the third repeating unit including at least one selected from the group consisting of Chemical Formula 11 to Chemical Formula 13; and the fourth repeating unit including at least one selected from the group consisting of Chemical Formula 14 and Chemical Formula 15 and a polymer containing the first repeating unit including at least one selected from the group consisting of Chemical Formula 1 to Chemical Formula 3 and the second repeating unit including at least one selected from the group consisting of Chemical Formula 4 and Chemical Formula 5 may be 10:90 to 90:10, 15:85 to 85:15, or 20:80 to 80:20.

Meanwhile, the polymer containing the third repeating unit including at least one selected from the group consisting of Chemical Formula 11 to Chemical Formula 13; and the fourth repeating unit including at least one selected from the group consisting of Chemical Formula 14 and Chemical Formula 15, is used for the liquid crystal alignment film in the state in which the polymer containing the first repeating unit including at least one selected from the group consisting of Chemical Formula 1 to Chemical Formula 3 and the second repeating unit including at least one selected from the group consisting of Chemical Formula 4 and Chemical Formula 5 is mixed, thereby significantly increasing the electrical characteristics of the alignment film such as voltage holding ratio.

Although the thickness of the liquid crystal alignment film is not particularly limited, for example, it is freely adjustable within the range of 0.01 μm to 1000 μm. When the thickness of the liquid crystal alignment film increases or decreases by a specific numerical value, the physical properties measured from the liquid crystal alignment film can also be changed by a certain value.

Meanwhile, the liquid crystal alignment film may have a brightness fluctuation rate of 3.5% or less, 0.1% to 3.5%, 2% to 3%, or 2.1% to 2.9%, which is represented by the following Mathematical Formula 1.

Brightness fluctuation rate (%)=[Initial brightness measured before driving the liquid crystal display device including the liquid crystal alignment film (L0)−Brightness measured after driving (L1)]/Initial brightness measured before driving (L0)×100    [Mathematical Formula 1]

In Mathematical Formula 1, the initial brightness measured before driving the liquid crystal display device including the liquid crystal alignment film (L0) is a brightness in a black mode in which polarizing plates are adhered to the upper plate and lower plate of the liquid crystal display device such that they are perpendicular to each other, and the polarizing plates are adhered to a backlight of 7000 cd/m$^2$; and the brightness measured after driving (L1) is a brightness in a black mode in which, after driving the liquid crystal display device at room temperature with an AC voltage of 5 V for 24 hours, polarizing plates are adhered to the upper plate and lower plate of the liquid crystal display device such that they are perpendicular to each other, and the polarizing plates are adhered to a backlight of 7000 cd/m².

Examples of the preparation method of the liquid crystal display device including the liquid crystal alignment film are not particularly limited, and various preparation methods of liquid crystal display devices, which are previously known in the art, can be applied. Preferably, a sealing agent impregnated with ball spacers having a size of 3 μm is applied to the edge of the upper plate except at the liquid crystal injection hole, the alignment films of the present invention formed on the upper plate and the lower plate are aligned such that they face each other and such that the alignment directions are aligned with each other, and then the upper and lower plates are bonded together and the sealing agent is cured to prepare an empty space, and subsequently, a liquid crystal is injected into the empty cells to prepare an IPS mode liquid crystal display device.

Further, the liquid crystal alignment film may have a retardation value of 3 nm or higher, 4 nm or higher, 3 nm to 10 nm, 4 nm to 10 nm, 7 nm to 10 nm, or 7.9 nm to 9.5 nm. The retardation for the liquid crystal alignment film can be measured, for example, by irradiating polarized light having a wavelength of 550 nm using AxoStep equipment manufactured by Axomertics.

In general, the retardation of a birefringent material at a predetermined wavelength λ can be defined by a product of birefringence at the wavelength αη and the layer thickness d. At this time, the birefringence Δη can be obtained by the following Mathematical Formula 2:

$$\Delta\eta = \eta_e - \eta_0 \quad \text{[Mathematical Formula 2]}$$

wherein, in Mathematical Formula 2, $\eta_0$ is defined as the refractive index in a direction having a constant speed regardless of the polarization direction of light, and $\eta_e$ is defined as the refractive index in a direction having a different speed depending on the polarization direction.

The liquid crystal alignment film has a relatively high retardation value of 3 nm or higher, 4 nm or higher, 3 nm to 10 nm, 4 nm to 10 nm, 7 nm to 10 nm, or 7.9 nm to 9.5 nm. This is presumably because the liquid crystal alignment film is prepared using the liquid crystal aligning composition in which an epoxy additive with a specific structure (for example, a benzoate-based epoxy) is mixed together with a polyimide precursor.

Specifically, the liquid crystal aligning agent composition described above is coated onto a substrate and dried to form a film, which is then directly irradiated with linearly polarized light without an imidization process to induce initial anisotropy, and subsequently, alignment of the reactive mesogenic epoxy present in the alignment film is induced initially through a low-temperature heat treatment, followed by carrying out an epoxy reaction to produce a reactive mesogenic liquid crystal film in the alignment film. Then, while carrying out a high-temperature heat treatment at a higher temperature than that of the low-temperature heat treatment to thereby proceed with imidization, the alignment stabilization can be simultaneously achieved due to the anisotropy of the liquid crystal film prepared in the low-temperature heat treatment process. Accordingly, it is possible to prevent the occurrence of the residual image characteristic while enhancing the film strength by using the reactive mesogenic epoxy.

The liquid crystal alignment film prepared according to the method for preparing a liquid crystal alignment film as described above has features in that it not only exhibits excellent alignment properties, but also has excellent high-temperature AC brightness variation, and in addition, it can maintain a high voltage holding ratio for a long period of time.

Furthermore, the liquid crystal alignment film may have film strength of 2H or higher, 2H to 5H, or 3H to 4H. Examples of the method for measuring the film strength are not particularly limited, but for example, it can be measured by a pencil hardness tester according to the ASTM D3363 test standard by loading a weight of 50 g and using pencils of various hardnesses.

The liquid crystal alignment film can be prepared by a specific method for preparing a liquid crystal alignment film described below. One example of the method for preparing liquid crystal alignment film may include the steps of: 1) coating a liquid crystal aligning agent composition onto a substrate to form a coating film; 2) drying the coating film; 3) irradiating the coating film immediately after the drying step with light to perform alignment treatment; 4) subjecting the alignment-treated coating film to a low-temperature heat-treatment at 200° C. or lower; and 5) subjecting the heat-treated coating film to heat treatment at a higher temperature than that of the low-temperature heat treatment to cure it, wherein the liquid crystal aligning agent composition includes i) a first polymer for a liquid crystal aligning agent including at least two repeating units selected from the group consisting of a repeating unit represented by Chemical Formula 1, a repeating unit represented by Chemical Formula 2, and a repeating unit represented by Chemical Formula 3, ii) a second polymer for a liquid crystal aligning agent including a repeating unit represented by Chemical Formula 11, a repeating unit represented by Chemical Formula 12, and a repeating unit represented by Chemical Formula 13, and iii) a reactive mesogenic epoxy.

The step of drying the coating film (step 2) is for removing a solvent or the like used in the liquid crystal aligning agent composition, and for example, a method such as heating of a coating film or vacuum evaporation may be used. The drying may be preferably carried out at 50° C. to 130° C., and more preferably at 70° C. to 120° C.

The step of irradiating the coating film immediately after the drying step with light to perform the alignment treatment (step 3) is a step of irradiating the coating film that is dried in step 2 with light to perform the alignment treatment.

In the present specification, the "coating film immediately after the drying step" refers to irradiating the light immediately after the drying step without carrying out a heat treatment at a temperature equal to or higher than that of the drying step, and other steps in addition to the heat treatment can be added.

More specifically, when a liquid crystal alignment film is prepared using a conventional liquid crystal aligning agent including polyamic acid or a polyamic acid ester, it includes a step of irradiating light after essentially carrying out a high-temperature heat treatment for imidization of the polyamic acid. However, when a liquid crystal alignment film is prepared using the liquid crystal aligning agent of one embodiment described above, it does not include the heat treatment step, but light is directly irradiated to perform alignment treatment, and then the alignment-treated coating film is cured by a heat treatment, thereby preparing a liquid crystal alignment film having sufficient alignment properties and improved stability even under a small amount of light irradiation energy.

In addition, in the alignment treatment step, the light irradiation is preferably performed by irradiating polarized ultraviolet light having a wavelength of 150 nm to 450 nm. Herein, the intensity of the light exposure varies depending on the kind of the polymer for the liquid crystal aligning agent, and preferably energy of 10 mJ/cm$^2$ to 10 J/cm$^2$, and more preferably energy of 30 mJ/cm$^2$ to 2 J/cm$^2$, may be irradiated.

As for the ultraviolet light, polarized ultraviolet light selected from ultraviolet light used for polarization treatment through a method of penetrating or reflecting a polarizing device, for example the polarizing device using a substrate coated with a dielectric anisotropic material on the surface of a transparent substrate such as quartz glass, soda lime glass, soda lime free glass, etc., a polarizer plate on which aluminum or metal wires are finely deposited, or a Brewster's polarizing device by the reflection of quartz glass, etc., are irradiated to perform the alignment treatment. In this case, the polarized ultraviolet light may be irradiated perpendicularly to the surface of the substrate, or may be irradiated by directing an angle of incidence at a specific angle. By this method, the alignment ability of the liquid crystal molecules is imparted to the coating film.

The step of subjecting the alignment-treated coating film to a low-temperature heat-treatment (step 4) is a step of subjecting the alignment-treated coating film in step 3 to low-temperature heat treatment.

As described above, since the initial anisotropy is induced by directly irradiating a linearly polarized light without an imidization process in Step 3, this is a step of re-aligning a part of the alignment film and initially inducing alignment of the reactive mesogenic epoxy present in the alignment film through a low-temperature heat treatment, followed by carrying out an epoxy reaction to prepare a reactive mesogenic liquid crystal film in the alignment film. Further, such a low-temperature heat treatment step is distinguished from the step of curing the alignment-treated coating film by heat treatment to be described later.

The temperature for the low-temperature heat treatment is preferably 200° C. or lower. Preferably, the temperature for the low-temperature heat treatment is 110° C. to 200° C., more preferably 120° C. to 180° C., or 120° C. to 140° C. In this case, the means of the heat treatment is not particularly limited, and may be carried out by a heating means such as a hot plate, a hot air circulation path, an infrared ray furnace, and the like.

The step of subjecting the heat-treated coating film to heat treatment at a higher temperature than that of the low-temperature heat treatment to cure it (step 5) is a step of subjecting the coating film heat-treated at a low temperature in step 4 to a high-temperature heat treatment to cure it.

The step of subjecting the alignment-treated coating film to a heat treatment to cure it is a step that is carried out after the irradiation of light even in the method for preparing a liquid crystal alignment film using a polymer for a liquid crystal aligning agent including a conventional polyamic acid or polyamic acid ester, and is distinguished from the heat treatment step which is carried out for the imidization of the liquid crystal aligning agent composition after coating the liquid crystal aligning agent composition onto a substrate and before irradiating the light or while irradiating the light.

In addition, the epoxy reaction of the reactive mesogenic epoxy is carried out, and thus the alignment stabilization can be improved. Accordingly, the temperature for the heat treatment is a temperature at which the imidization of the polymers for the liquid crystal aligning agent and the epoxy reaction of the reactive mesogenic epoxy are carried out, and is preferably higher than the temperature for the low temperature heat treatment of step 4. Preferably, the temperature at which the heat treatment is carried out is 200° C. to 250° C., more preferably at 210° C. to 240° C. In this case, the means of the heat treatment is not particularly limited, and may be carried out by a heating means such as a hot plate, a hot air circulation path, an infrared ray furnace, and the like.

Meanwhile, in the step of coating a liquid crystal aligning agent composition onto a substrate to form a coating film (step 1), the first polymer for the liquid crystal aligning agent and the second polymer for the liquid crystal aligning agent may be mixed in a weight ratio of about 15:85 to 85:15, preferably about 20:80 to 80:20. As described above, the first polymer for the liquid crystal aligning agent includes a certain amount of already imidized imide repeating units, and thus it has a feature in that anisotropy can be produced by directly irradiating light without a high-temperature heat treatment process after the formation of the coating film, followed by carrying out a heat treatment to complete the alignment film. The second polymer for the liquid crystal aligning agent has a feature in that it can enhance the electrical characteristics such as voltage holding ratio. When the first polymer for the liquid crystal aligning agent and the second polymer for the liquid crystal aligning agent having such characteristics are mixed in the above weight ratio range and used, the excellent photo-reaction characteristics and liquid crystal alignment properties of the first polymer for the liquid crystal aligning agent and the excellent electrical characteristics of the second polymer for the liquid crystal aligning agent can complement each other, and thus a liquid crystal alignment film having excellent alignment properties and electrical characteristics can be simultaneously prepared.

The reactive mesogenic epoxy refers to a compound in which a glycidyl group is substituted at both terminals of a mesogenic group. Specifically, the reactive mesogenic epoxy may be a compound represented by the following Chemical Formula 17:

$$R_{20}\text{-MG-}R_{21} \quad \text{[Chemical Formula 17]}$$

wherein, in Chemical Formula 17, $R_{20}$ and $R_{21}$ are each independently glycidyloxy or N(glycidyloxy)$_2$, and MG is a divalent mesogenic group.

Preferably, the MG is represented by the following Chemical Formula 18:

$$*\text{---}Ar_3\text{---}(M\text{---}Ar_4)_y\text{---}* \quad \text{[Chemical Formula 18]}$$

wherein, in Chemical Formula 18, $Ar_3$ and $Ar_4$ are each independently an arylene group having 6 to 30 carbon atoms, each M is independently a single bond, an alkylene having 1 to 3 carbon atoms, —COO—, —OCO—, —C(CH$_3$)=CH—, or —C(CH$_3$)=N—N=C(CH$_3$)—, and y is 0, 1, or 2.

Specific examples of the arylene group having 6 to 30 carbon atoms include a phenylene group, a biphenylene group, a terphenylene group, a naphthylene group, an anthracenylene group, a phenanthrylene group, a pyrenylene group, a perylenylene group, a chrycenylene group, a fluorenyl group, or the like.

In addition, in the functional group represented by Chemical Formula 18, when y is 2, it may be a functional group represented by the following Chemical Formula 18-1:

$$*\text{---}Ar_3\text{-M'-}(Ar_4)'\text{-M*-}(Ar_4)*\text{---}* \quad \text{[Chemical Formula 18-1]}$$

wherein, in Chemical Formula 18-1, $Ar_a$, $(Ar_4)'$, and $(Ar_4)''$ are each independently phenylene or biphenylene, M' is —COO—, and M" may be —OCO—.

More preferably, the MG is any one selected from the group consisting of the following:

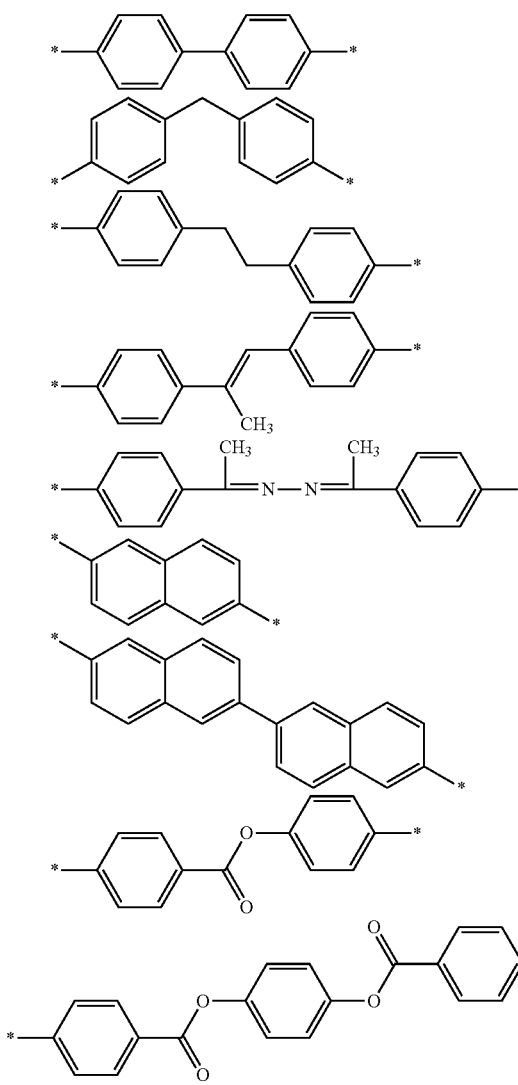

Meanwhile, the method of coating the liquid crystal aligning agent composition onto a substrate is not particularly limited, and for example, a method such as screen printing, offset printing, flexographic printing, inkjet printing, and the like can be used.

Furthermore, the liquid crystal aligning agent composition may be a composition in which the first polymer for the alignment agent and the second polymer for the alignment agent are dissolved or dispersed in an organic solvent.

Liquid Crystal Display Device

In addition, the present invention provides a liquid crystal display device including the liquid crystal alignment film described above.

The liquid crystal alignment film may be introduced into a liquid crystal cell by a known method, and likewise, the liquid crystal cell may be introduced into a liquid crystal display device by a known method. Examples of the preparation method of the liquid crystal display device including the liquid crystal alignment film are not particularly limited, but various preparation methods of the liquid crystal display device, which are previously known in the art, can be applied. Preferably, a sealing agent impregnated with ball spacers having a size of 3 μm is applied to the edge of the upper plate except at the liquid crystal injection hole, and the alignment films of the present invention formed on the upper plate and the lower plate are aligned such that they face each other and such that the alignment directions are aligned with each other, and then the upper and lower plates are bonded together and the sealing agent is cured to prepare an empty space. Subsequently, liquid crystal is injected into the empty cells to produce a parallel-alignment mode liquid crystal display device.

Advantageous Effects

According to the present invention, a liquid crystal alignment film not only having excellent alignment property and stability, but also having high film strength and thus exhibiting excellent durability and high residual image characteristics, and a liquid crystal display device using the same, can be prepared.

DETAILED DESCRIPTION OF THE EMBODIMENTS

Hereinafter, the present invention will be described in more detail by way of examples. However, these examples are given for illustrative purposes only, and the scope of the invention is not intended to be limited by these examples.

Preparation Example 1: Synthesis of Diamine

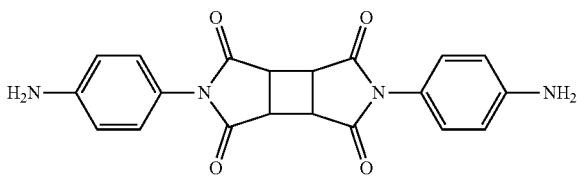 [SMILES: Nc1ccc(N2C(=O)C3C(C2=O)C2C(=O)N(c4ccc(N)cc4)C(=O)C32)cc1]

Cyclobutane-1,2,3,4-tetracarboxylic dianhydride (CBDA) and 4-nitroaniline were dissolved in DMF (dimethylformamide) to prepare a mixture. Then, the mixture was reacted at about 80° C. for about 12 hours to prepare an amic acid. Subsequently, the amic acid was dissolved in DMF, and acetic anhydride and sodium acetate were added thereto to prepare a mixture. Then, the amic acid contained in the mixture was imidized at about 90° C. for about 4 hours. The thus-obtained imide was dissolved in DMAc (dimethylacetamide), and then Pd/C was added thereto to prepare a mixture. The mixture was reduced at 45° C. under hydrogen pressure of 6 bar for 20 minutes to prepare a diamine.

Preparation Example 2: Preparation of Polymer for Liquid Crystal Aligning Agent P-1

(Step 1)

5.0 g (13.3 mmol) of the diamine prepared in Preparation Example 1 was completely dissolved in 71.27 g of anhydrous N-methyl pyrrolidone (NMP). Then, 2.92 g (13.03 mmol) of 1,3-dimethyl-cyclobutane-1,2,3,4-tetracarboxylic dianhydride was added to the solution under an ice bath and stirred at room temperature for 16 hours.

(Step 2)

The solution obtained in step 1 was poured into an excess amount of distilled water to form a precipitate. Then, the formed precipitate was filtered and washed twice with distilled water and three times with methanol. The solid product thus obtained was dried in a decompression oven at 40° C. for 24 hours to obtain 6.9 g of a polymer for a liquid crystal aligning agent P-1.

As a result of confirming the molecular weight of P-1 through GPC, the number average molecular weight (Mn) was 15,500 g/mol, and the weight average molecular weight (Mw) was 31,000 g/mol. Further, the monomer structure of the polymer P-1 was determined by the equivalent ratio of the monomers used, and the ratio of the imine structure in the molecule was 50.5%, while the ratio of the amic acid structure was 49.5%.

Preparation Example 3: Preparation of Polymer for Liquid Crystal Aligning Agent Q-1

5.00 g of 4,4'-methylenedianiline and 5.05 g of 4,4'-oxydianiline were completely dissolved in 221.4 g of NMP. Then, 14.55 g of 4,4'-biphthalic anhydride was added to the solution under an ice bath and stirred at room temperature for 16 hours. Subsequently, the polymer Q-1 was prepared in the same manner as in step 2 of Preparation Example 2.

Example 1

(1) Preparation of Liquid Crystal Aligning Agent Composition 5 parts by weight of P-1 prepared in Preparation Example 2, 5 parts by weight of Q-1 prepared in Preparation Example 3, and 0.8 parts by weight of 4-(oxiran-2-ylmethoxy)phenyl 4-(oxiran-2-ylmethoxy)benzoate represented by the following Chemical Formula a (8% by weight relative to the polymer for the liquid crystal aligning agent) were completely dissolved in a mixed solvent of NMP and n-butoxyethanol in a weight ratio of 8:2. Then, the resultant was subjected to pressure filtration with a filter made of poly(tetrafluoroethylene) having a pore size of 0.2 μm to prepare a liquid crystal aligning agent composition.

[Chemical Formula a]

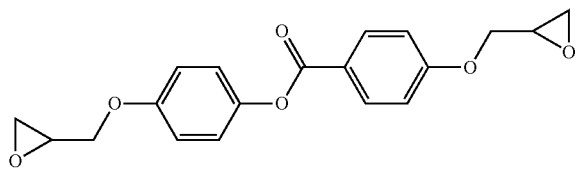

(2) Preparation of Liquid Crystal Alignment Film

The liquid crystal aligning agent composition prepared in Example 1 was coated onto a substrate (lower plate) in which comb-shaped IPS mode-type ITO electrode patterns having a thickness of 60 nm, an electrode width of 3 μm, and spacing between the electrodes of 6 μm were formed on a rectangular glass substrate having a size of 2.5 cm×2.7 cm and onto a glass substrate (upper plate) having no electrode pattern each using a spin coating method.

Then, the substrates onto which the liquid crystal aligning agent composition was coated were placed on a hot plate at about 80° C. for one minute to evaporate the solvent. In order to align the thus-obtained coating film, ultraviolet light of 254 nm was irradiated with an intensity of 0.3 J/cm$^2$ using an exposure apparatus in which a linear polarizer was adhered to the coating film of each of the upper and lower plates.

Subsequently, the coating film was placed on a hot plate at 130° C. for 500 seconds, thereby subjecting it to a low-temperature heat treatment. Then, the coating film was calcinated (cured) in an oven at about 230° C. for 20 minutes to obtain a liquid crystal alignment film having a film thickness of 0.1 μm.

Example 2

A liquid crystal aligning agent composition and a liquid crystal alignment film were prepared in the same manner as in Example 1, except that 4-(oxiran-2-ylmethoxy)phenyl 4-(oxiran-2-ylmethoxy)benzoate was used in an amount of 1.0 parts by weight (10% by weight relative to the polymer for the liquid crystal aligning agent).

Example 3

A liquid crystal aligning agent composition and a liquid crystal alignment film were prepared in the same manner as in Example 1, except that 1,4-phenylene bis(4-(oxiran-2-ylmethoxy)benzoate represented by the following Chemical Formula b was used instead of 4-(oxiran-2-ylmethoxy) phenyl 4-(oxiran-2-ylmethoxy)benzoate represented by Chemical Formula a.

[Chemical Formula b]

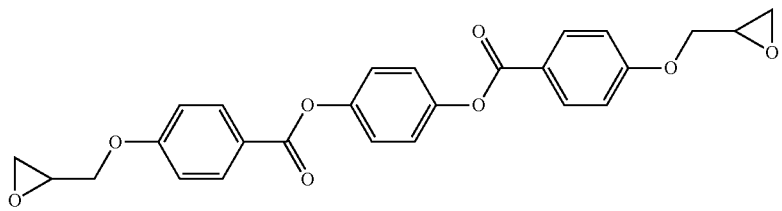

Example 4

A liquid crystal aligning agent composition and a liquid crystal alignment film were prepared in the same manner as in Example 1, except that biphenyl-4,4'-diyl bis(4-(oxiran-2-ylmethoxy)benzoate) represented by the following Chemical Formula c was used instead of 4-(oxiran-2-ylmethoxy)phenyl 4-(oxiran-2-ylmethoxy)benzoate represented by Chemical Formula a.

[Chemical Formula c]

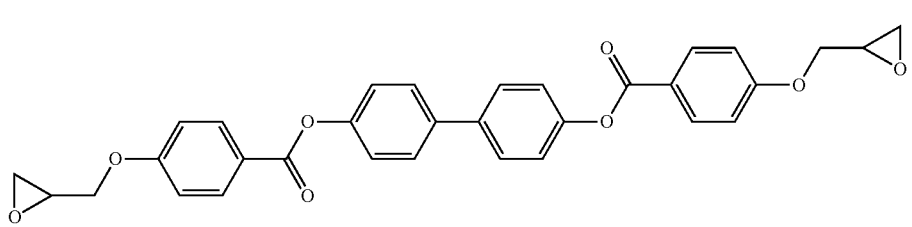

Comparative Example 1

A liquid crystal aligning agent composition and a liquid crystal alignment film were prepared in the same manner as in Example 1, except that the following compound (BATG) was used instead of 4-(oxiran-2-ylmethoxy)phenyl 4-(oxiran-2-ylmethoxy)benzoate represented by Chemical Formula a.

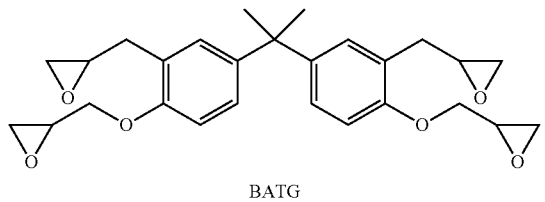 [SMILES: CC(C)(c1ccc(OCC2CO2)c(CC2CO2)c1)c1ccc(OCC2CO2)c(CC2CO2)c1]

BATG

Comparative Example 2

A liquid crystal aligning agent composition and a liquid crystal alignment film were prepared in the same manner as in Example 1, except that the following compound (CDMDG) was used instead of 4-(oxiran-2-ylmethoxy)phenyl 4-(oxiran-2-ylmethoxy)benzoate represented by Chemical Formula a.

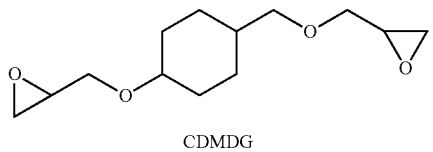 [SMILES: C1CC(OCC2CO2)CCC1COCC1CO1]

CDMDG

Comparative Example 3

A liquid crystal aligning agent composition and a liquid crystal alignment film were prepared in the same manner as in Example 1, except that the low-temperature heat treatment was omitted and that the calcination (curing) temperature was changed to 240° C.

Comparative Example 4

A liquid crystal aligning agent composition and a liquid crystal alignment film were prepared in the same manner as in Example 2, except that the low-temperature heat treatment was omitted and the calcination (curing) temperature was changed to 240° C.

Comparative Example 5

A liquid crystal aligning agent composition and a liquid crystal alignment film were prepared in the same manner as in Example 1, except that 4-(oxiran-2-ylmethoxy)phenyl 4-(oxiran-2-ylmethoxy)benzoate represented by Chemical Formula a was not used.

Experimental Example

A sealing agent impregnated with ball spacers having a size of 3 μm was applied to the edge of the upper plate except at the liquid crystal injection hole. Further, the alignment films of the examples and comparative examples formed on the upper plate and the lower plate were aligned such that they faced each other and such that the alignment directions are aligned with each other, and then the upper and lower plates were bonded together and the sealing agent was cured to prepare an empty space. Subsequently, a liquid crystal was injected into the empty cells to produce a parallel-alignment mode liquid crystal cell.

(1) Retardation (R)

The retardation (R) of the liquid crystal alignment films obtained in the examples and comparative examples was measured. Specifically, each retardation was measured by irradiating polarized light having a wavelength of 550 nm using AxoStep equipment manufactured by Axomertics, and the average value of the measured values for 5 repeated measurements is shown in Table 1 below.

(2) Film Strength

The film strength for the alignment films obtained in the examples and comparative examples was measured, and the results are shown in Table 1 below. Specifically, the film strength of the alignment films was measured via a pencil hardness tester according to ASTM D3363 test standard by loading a weight of 50 g and using pencils of various hardnesses.

(3) Brightness Fluctuation Rate

The brightness fluctuation rate of the liquid crystal cells prepared was measured using the liquid crystal alignment films obtained in the examples and comparative examples. Specifically, polarizing plates were adhered to the upper plate and lower plate of the liquid crystal cells such that they were perpendicular to each other. Then, the liquid crystal cells, to which the polarizing plates were adhered, were adhered onto a backlight of 7000 cd/m², and the brightness in a black mode was measured using PR-880 equipment, which is a device for measuring the brightness. Then, the liquid crystal cells were driven at room temperature for 24 hours with an AC voltage of 5 V. Subsequently, the brightness in a black mode was measured in the same manner as described above in a state in which the voltage of the liquid crystal cells was turned off, and the results are shown in Table 1 below.

The difference between the initial luminance (L0) measured before driving the liquid crystal cell and the luminance (L1) measured after driving was divided by the initial luminance (L0) and multiplied by 100 to calculate the brightness fluctuation rate. As the thus-calculated brightness fluctuation rate is closer to 0%, it means that the alignment stability is excellent.

TABLE 1

| Category | Epoxy additives | Retardation (nm) | Film strength | Brightness fluctuation rate |
|---|---|---|---|---|
| Example 1 | A-1 (8% by weight relative to the polymer for the liquid crystal aligning agent) | 8.3 | 3H | 2.7% |
| Example 2 | A-1 (10% by weight relative to the polymer for the liquid crystal aligning agent) | 7.9 | 4H | 2.9% |
| Example 3 | A-2 (8% by weight relative to the polymer for the liquid crystal aligning agent) | 8.7 | 3H | 2.5% |
| Example 4 | A-3 (8% by weight relative to the polymer for the liquid crystal aligning agent) | 9.5 | 3H | 2.1% |
| Comparative Example 1 | B-1 (8% by weight relative to the polymer for the liquid crystal aligning agent) | 2.6 | 3H | 8.4% |
| Comparative Example 2 | B-2 (8% by weight relative to the polymer for the liquid crystal aligning agent) | 2.4 | 3H | 7% |
| Comparative Example 3 | A-1 (8% by weight relative to the polymer for the liquid crystal aligning agent) | 2.3 | 3H | 4% |
| Comparative Example 4 | A-1 (10% by weight relative to the polymer for the liquid crystal aligning agent) | 2.8 | 4H | 6% |
| Comparative Example 5 | — | 3.9 | 0H | 2.1% |

*A-1: 4-(oxiran-2-ylmethoxy)phenyl 4-(oxiran-2-ylmethoxy)benzoate
*A-2: 1,4-phenylene bis(4-(oxiran-2-ylmethoxy)benzoate)
*A-3: biphenyl-4,4'-diyl bis(4-(oxiran-2-ylmethoxy)benzoate)
*B-1: BATG

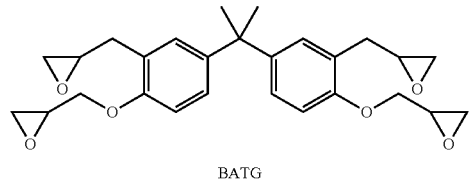 [SMILES: CC(C)(c1ccc(OCC2CO2)c(CC2CO2)c1)c1ccc(OCC2CO2)c(CC2CO2)c1]

BATG

*B-2: CDMDG

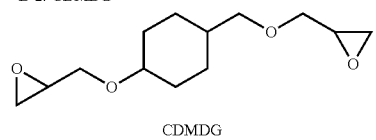

CDMDG

As shown in Table 1 above, when the epoxy additives with different structures compared to those of the examples were used similarly to Comparative Examples 1 and 2, it was confirmed that the retardation value was significantly lower than those of the examples, and the brightness fluctuation rate was increased. From this, it was confirmed that, in the case of the liquid crystal alignment films obtained by using the phenyl benzoate-based RM (reactive mesogen) epoxy additive, the retardation is increased and thus excellent AC residual image characteristics can be realized, and further the brightness fluctuation rate is reduced and thus excellent alignment stability can be realized.

In addition, in Table 1, similarly to Comparative Examples 3 and 4, although the same amount of the phenyl benzoate-based epoxy additive was used, when the low-temperature heat treatment was omitted and the calcination (curing) temperature was changed to 240° C., it was confirmed that the retardation value was significantly lower than those of the examples, and the brightness fluctuation rate was increased. From this, it was confirmed that, similarly to the examples, as curing was carried out after heat treatment, the retardation of the finally prepared alignment film is increased and thus excellent AC residual image characteristics can be realized, and further, the brightness fluctuation rate is reduced and thus excellent alignment stability can be realized.

Meanwhile, similarly to Comparative Example 5, when no phenyl benzoate-based epoxy additives were added, it was confirmed that the film strength was significantly reduced compared to those of the examples, and thus the strength of the liquid crystal alignment films can be enhanced by using the specific epoxy additives in the examples.

The invention claimed is:

1. A liquid crystal alignment film comprising:
   a first polymer containing
   a first repeating unit including at least one selected from the group consisting of the following Chemical Formula 1 to Chemical Formula 3; and
   a second repeating unit including at least one selected from the group consisting of the following Chemical Formula 4 and Chemical Formula 5,
   wherein the liquid crystal alignment film has a retardation value of 3 nm or higher,
   wherein the liquid crystal alignment film has a brightness fluctuation rate of 3.5% or less according to Mathematical Formula 1:

Brightness fluctuation rate (%)=100×[Initial brightness measured before driving the liquid crystal display device including the liquid crystal alignment film (L0)−Brightness measured after driving (L1)]/Initial brightness measured before the driving (L0), [Mathematical Formula 1]

wherein the L0 in the Mathematical Formula 1 is a brightness in a black mode in which polarizing plates are adhered to an upper plate and a lower plate of the liquid crystal display device such that they are perpendicular to each other, and the polarizing plates are adhered to a backlight of 7000 cd/m², and
   wherein the L1 in Mathematical Formula 1 is a brightness in a black mode in which, after driving the liquid crystal display device at room temperature with an AC voltage of 5 V for 24 hours, polarizing plates are adhered to an upper plate and a lower plate of the liquid crystal display device such that they are perpendicular to each other, and the polarizing plates are adhered to a backlight of 7000 cd/m², and wherein the liquid crystal alignment film has a film strength of at least 2H according to the ASTM D3363 test standard:

[Chemical Formula 1]

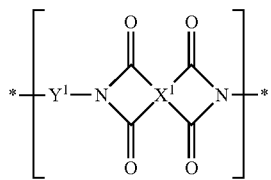

[Chemical Formula 2]

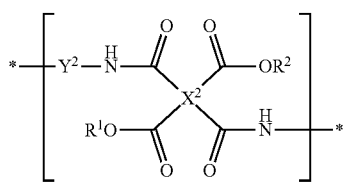

[Chemical Formula 3]

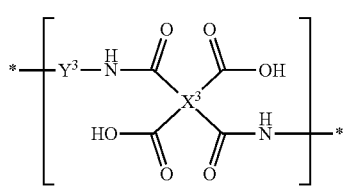

[Chemical Formula 4]

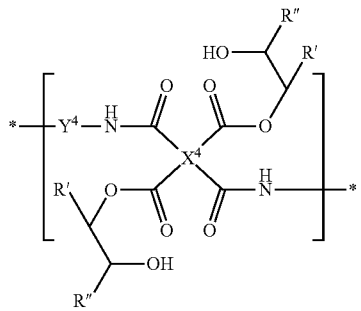

[Chemical Formula 5]

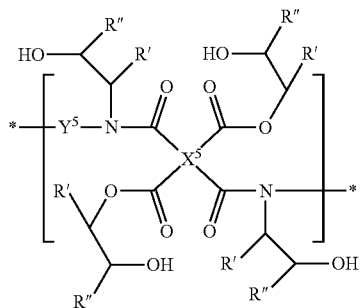

wherein at least one of $R^1$ and $R^2$ is an alkyl group having 1 to 10 carbon atoms, and the rest are hydrogen, and $X^1$ to $X^5$ are each independently a tetravalent organic group represented by the following Chemical Formula 6:

[Chemical Formula 6]

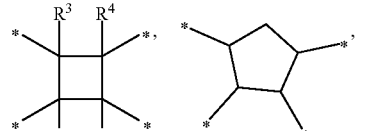

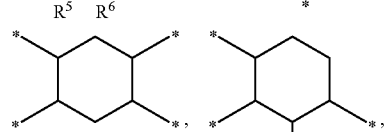

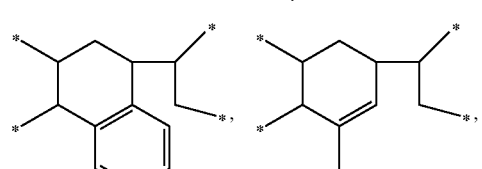

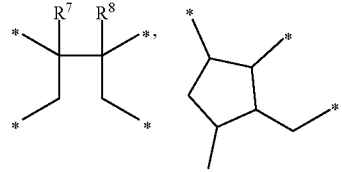

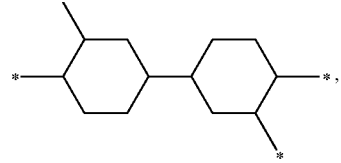

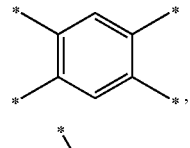

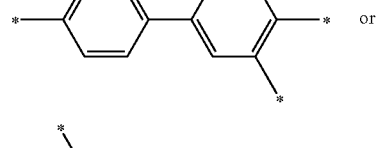

or

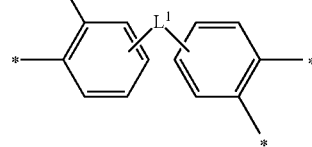

wherein $R^3$ to $R^8$ are each independently hydrogen or an alkyl group having 1 to 10 carbon atoms, $L^1$ is any one selected from the group consisting of a direct bond, —O—, —CO—, —COO—, —S—, —SO—, —SO$_2$—, —CR$^9$R$^{10}$—, —(CH$_2$)$_Z$—, —O(CH$_2$)$_Z$O—, —COO(CH$_2$)$_Z$OCO—, —CONH—, phenylene, or a combination thereof, wherein $R^9$ and $R^{10}$ are each independently hydrogen, an alkyl group having 1 to 10 carbon atoms, or a fluoroalkyl group having 1 to 10 carbon atoms, Z is an integer of 1 to 10, and Y$^1$ to Y$^5$ are each independently a divalent organic group represented by the following Chemical Formula 7:

[Chemical Formula 7]

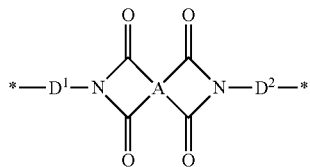

wherein A is a tetravalent organic group represented by Chemical Formula 6, and

D$^1$ and D$^2$ are each independently an arylene group having 6 carbon atoms, and wherein at least one of R' and R" is a functional group containing a mesogenic group, and the other is hydrogen, wherein the functional group containing the mesogenic group is represented by the following Chemical Formula 8:

[Chemical Formula 8]

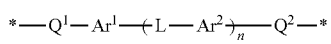

wherein Ar$^1$ and Ar$^2$ are each independently an arylene group having 6 to 30 carbon atoms, Q$^1$ and Q$^2$ are a direct bond, an alkylene group having 1 to 10 carbon atoms, or an alkyleneoxy group having 1 to 10 carbon atoms, each L is independently a direct bond, —COO—, —OCO—, —C(CH$_3$)=CH—, or —C(CH$_3$)=N—N=C(CH$_3$)—, and n is 0, 1, or 2.

2. The liquid crystal alignment film of claim 1, wherein Ar$^1$ and Ar$^2$ in Chemical Formula 8 are each independently phenylene, Q$^1$ and Q$^2$ are an alkyleneoxy group having 1 to 3 carbon atoms, L is —COO—, and n is 1.

3. The liquid crystal alignment film of claim 1, wherein Ar$^1$ and Ar$^2$ in Chemical Formula 8, are each independently phenylene, Q$^1$ and Q$^2$ are each independently an alkyleneoxy group having 1 to 3 carbon atoms, L is —COO— or —OCO—, and n is 2.

4. The liquid crystal alignment film of claim 1, wherein Ar$^1$ in Chemical Formula 8 is phenylene, and Ar$^2$ is phenylene or biphenylene, Q$^1$ and Q$^2$ are each independently an alkyleneoxy group having 1 to 3 carbon atoms, L is —COO— or —OCO—, and n is 2.

5. The liquid crystal alignment film of claim 1, wherein the first polymer further includes a functional group represented by the following Chemical Formula 9 or a functional group represented by the following Chemical Formula 10 at least one terminal end:

[Chemical Formula 9]

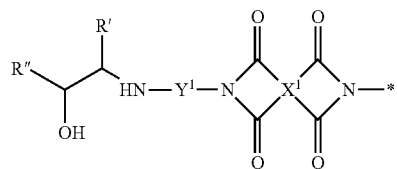

wherein X$^1$, Y$^1$, R', and R" in Chemical Formula 9 are as defined in claim 1, and

[Chemical Formula 10]

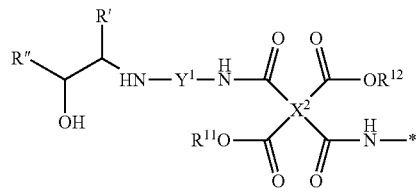

wherein R$^{11}$ and R$^{12}$ in Chemical Formula 10 are each independently hydrogen or an alkyl group having 1 to 10 carbon atoms, and X$^2$, Y$^2$, R', and R" in Chemical Formula 10 are as defined in claim 1.

6. The liquid crystal alignment film of claim 1, wherein the liquid crystal alignment film further includes a second polymer containing a third repeating unit including at least one selected from the group consisting of the following Chemical Formulae 11 to 13, and a fourth repeating unit including at least one selected from the group consisting of the following Chemical Formulae 14 and 15:

[Chemical Formula 11]

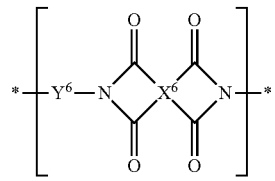

[Chemical Formula 12]

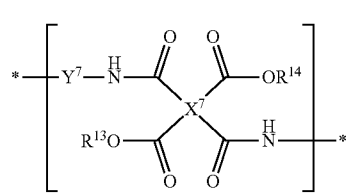

[Chemical Formula 13]

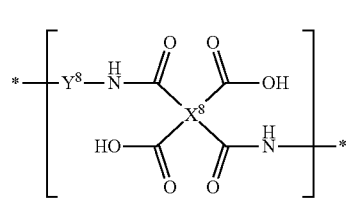

-continued

[Chemical Formula 14]

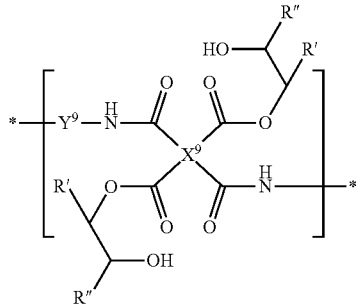

[Chemical Formula 15]

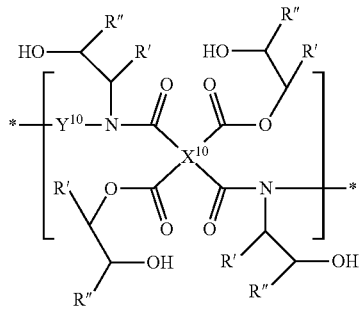

wherein at least one of $R^{13}$ and $R^{14}$ is an alkyl group having 1 to 10 carbon atoms, and the rest are hydrogen, $X^6$ to $X^{10}$ are each independently a tetravalent organic group represented by Chemical Formula 6 in claim 1, R' and R" are as defined in claim 1, and $Y^6$ to $Y^{10}$ are each independently a divalent organic group represented by the following Chemical Formula 16,

[Chemical Formula 16]

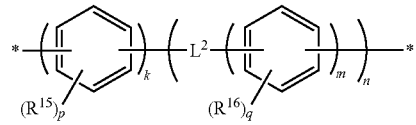

wherein $R^{15}$ and $R^{16}$ are each independently hydrogen, a halogen, a cyano, a nitrile, an alkyl having 1 to 10 carbon atoms, an alkenyl having 1 to 10 carbon atoms, an alkoxy having 1 to 10 carbon atoms, a fluoroalkyl having 1 to 10 carbon atoms, or a fluoroalkoxy having 1 to 10 carbon atoms, p and q are each independently an integer of 0 to 4, $L^2$ is a direct bond, —O—, —CO—, —S—, —$SO_2$—, —$C(CH_3)_2$—, —$C(CF_3)_2$—, —CONH—, —COO—, —$(CH_2)_y$—, —$O(CH_2)_yO$—, —$O(CH_2)_y$—, —NH—, —$NH(CH_2)_y$—NH—, —$NH(CH_2)_yO$—, —$OCH_2$—$C(CH_3)_2$—$CH_2O$—, —OCO—$(CH_2)_y$—OCO—, or —OCO—$(CH_2)_y$—COO—, y is an integer of 1 to 10, k and m are each independently an integer of 0 to 3, n is an integer of 0 to 3, and when n=0, k is 1 to 3, and when k=0, m and n are each independently 1 to 3.

7. The liquid crystal alignment film of claim 6, wherein a weight ratio between the second polymer and the first polymer is 10:90 to 90:10.

8. A liquid crystal display device including the liquid crystal alignment film of claim 1.

* * * * *